United States Patent [19]

Aoki et al.

[11] 4,298,259
[45] Nov. 3, 1981

[54] FOCUS DETECTING DEVICE FOR PHOTOGRAPHIC CAMERA

[75] Inventors: Harumi Aoki, Kiyose; Yoshio Sawada, Tokyo, both of Japan

[73] Assignee: Asaki Kogaku Kogyo Kabushiki Kaisha, Tokyo, Japan

[21] Appl. No.: 70,165

[22] Filed: Aug. 27, 1979

[51] Int. Cl.³ ............................................... G03B 3/10
[52] U.S. Cl. ........................................ 354/25; 354/31
[58] Field of Search .................... 354/25, 31; 352/140; 355/56

[56] References Cited

U.S. PATENT DOCUMENTS

| | | | |
|---|---|---|---|
| 4,047,022 | 9/1977 | Holle | 354/25 X |
| 4,171,155 | 10/1979 | Jyojiki et al. | 354/25 |
| 4,178,098 | 12/1979 | Asano et al. | 354/25 X |
| 4,183,642 | 1/1980 | Fukuoka | 354/25 |

*Primary Examiner*—Michael L. Gellner
*Attorney, Agent, or Firm*—Christie, Parker & Hale

[57] ABSTRACT

A focusing system for a camera using an array of photoelectric elements to sense the level of light at points in the image plane of an objective lens. The output of the elements are scanned in sequence to form a train of pulses whose amplitudes correspond to the level of light at the respective elements as they are scanned. The pulse train is split into two pulse trains of alternate pulses. The two pulse trains are separately converted to two analog signals and applied to a differential amplifier. The difference output is clamped to a reference potential and applied to a peak detector. When the objective is in focus, the output of the peak detector is at a maximum.

4 Claims, 8 Drawing Figures

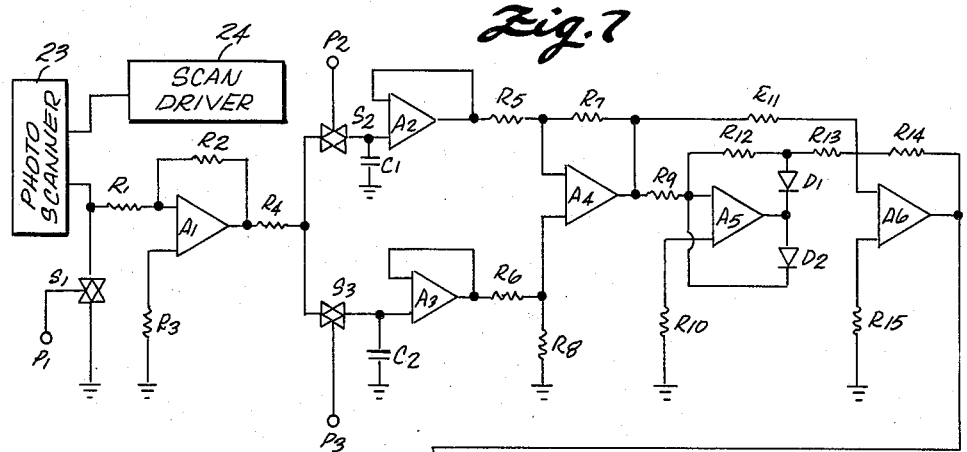
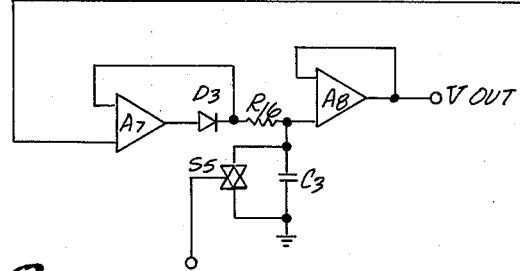
Fig. 7
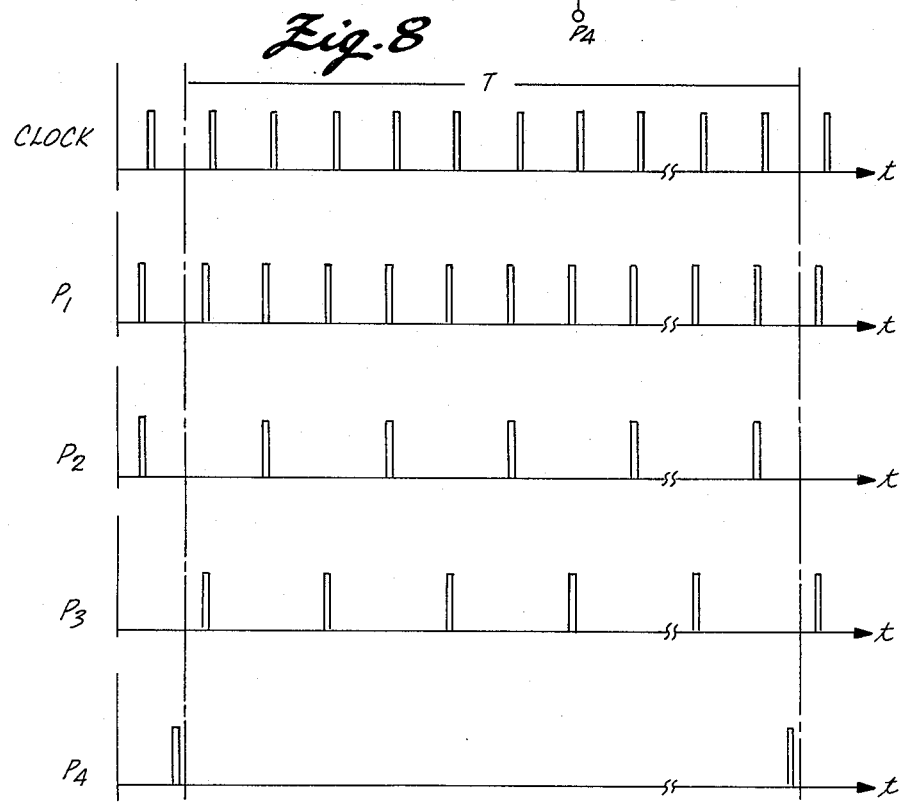
Fig. 8

FOCUS DETECTING DEVICE FOR PHOTOGRAPHIC CAMERA

FIELD OF THE INVENTION

The present invention relates to a device adapted to detect the focus on the basis of the principle that an object image exhibits the maximum contrast when the image is precisely focused.

BACKGROUND OF THE INVENTION

An optical image of an object to be photographed which is projected by an objective onto the image plane exhibits the maximum luminous difference or contrast in the image area when the image is precisely focused. Particularly with respect to the edge portion of the brightness distribution of the image, it is observed that the brightness variation curve exhibits the steepest slope when the image is precisely focused. Such phenomenon can be explained by the fact that the light intensity (power spectrum) of the object image with respect to each spatial frequency takes the maximum value when the image is precisely focused. There have already been proposed various automatic focus detecting devices based on such phenomenon. These well known devices can be generally classified into the following two types depending on the method of detection being used with the device. In the well known device of the first type, a plurality of microphotoelectric elements are arranged in the image plane and an output difference between a pair of adjacent ones of these microphotoelectric elements is detected as a contrast signal while, in the well known device of the second type, the object to be photographed is mechanically or electrically scanned to obtain a photoelectrically converted waveform having a series of time-spaced discontinuous peaks. An output is obtained by differentiation of this waveform, which output corresponds to a slope of the image brightness distribution. The output is used as a contrast signal. As an example of the latter, a compact device utilizing a self-scanning photoelectric element as the scanning means has recently been proposed and provided. This self-scanning photoelectric unit comprises a plurality of microphotoelectric elements and a scanner circuit. The unit accumulates a quantity of light to which the series of said microphotoelectric elements are exposed within a single cycle of scanning. The scanner circuit generates a waveform having a series of discontinuous peaks or pulses where amplitudes correspond to the level of light falling on the respective microphotoelectric elements. In this device a series of pulses from the self-scanning photoelectric element is converted to the corresponding analog waveform by using a sample and hold circuit and a filter. The analog signal is then subjected to action of the differentiator to extract the differentiated value from said waveform. This is, in turn, converted by the absolute value circuit to the corresponding absolute value waveform and thereafter the peak value of this output waveform for every cycle of scanning is detected and held. This peak value output is used as the contrast signal with which the focus is indicated or the objective is driven. The self-scanning photoelectric element is advantageous in that an adequate output is obtained even with respect to a low level luminance, since the element of this nature can accumulate a quantity of light within a single cycle of scanning.

Devices of the first type are more convenient in that no movable part is necessary, but it is difficult for this type to detect a low level of light. The well known device of the second type, in which the self-scanning photoelectric element is used and the brightness distribution of the image is differentiated, in spite of the advantage such that even a weak light can be detected under the accumulating action of said element, has the disadvantage that it is difficult for this type to hold the output and the circuit arrangement is necessarily complicated.

SUMMARY OF THE INVENTION

The object of the present invention is to provide an improved device for focus detection adapted to obtain a desired contrast signal without incorporation of the differentiator while making the most of a high photosensitivity characteristic of the self-scanning photoelectric element due to said accumulation effect. According to the present invention, the circuit arrangement can be simplified and thereby the device can be compact, since no differentiator is incorporated and the difficult operation of storing peak values is now unnecessary.

BRIEF DESCRIPTION OF THE DRAWINGS

The present invention will be described more in detail with reference to the accompanying drawings, wherein:

FIG. 3B shows a sample hold waveform, FIG. 3C shows a smoothed waveform, FIG. 3D shows a differential waveform, FIG. 3E shows an absolute value waveform, and FIG. 3F shows the waveform with peak value being held;

FIG. 6 diagrammatically shows the manner in which the waveform varies in the focus detecting device according to the present invention, in which FIG. 6A shows an output waveform from the self-scanning photoelectric element, FIG. 6B shows a first sample hold waveform, FIG. 6C shows a second sample hold waveform, FIG. 6D shows a difference waveform derived from two sample hold waveforms, and FIG. 6E shows a waveform with the peak value being held.

FIG. 7 is a circuit diagram illustrating an embodiment of the focus detecting device according to the present invention; and FIG. 8 is a timing chart of driving pulses for the self-scanning photoelectric element as well as of control pulses for four analog switches employed in the focus detecting device according to the present invention.

DETAILED DESCRIPTION

Figure 1:
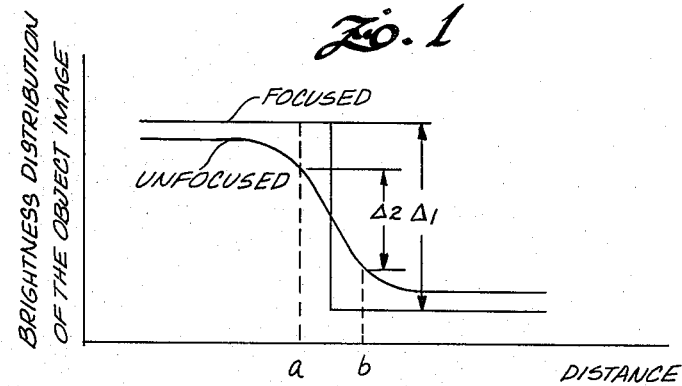
FIG. 1 diagrammatically illustrates a principle on which the present invention is based, showing a typical brightness distribution of an object to be photographed at focused and non-focused states.

FIG. 1 diagrammatically shows characteristic curves of brightness distribution of an object image exhibited when the latter is focused and not focused, respectively. It will be obvious from the diagram that the slope of these curves of brightness distribution become more gentle as the image deviates from the focus. Such slope can be expressed as a brightness difference between two points on the image area, which takes the maximum value when the object image is focused. A brightness difference between, for example, points a and b takes a value $\Delta_1$ when the image is focused and a value $\Delta_2$ when the image is not focused, and it will be apparent from the diagram that the value $\Delta_1$ is larger than the value $\Delta_2$. Thus, a desired focus detection can be achieved on the basis of such fact that the brightness difference (contrast signal) between two points on the image are particularly within a range corresponding to the slope of the brightness difference curve takes the maximum value when the image is focused.

Figure 2:
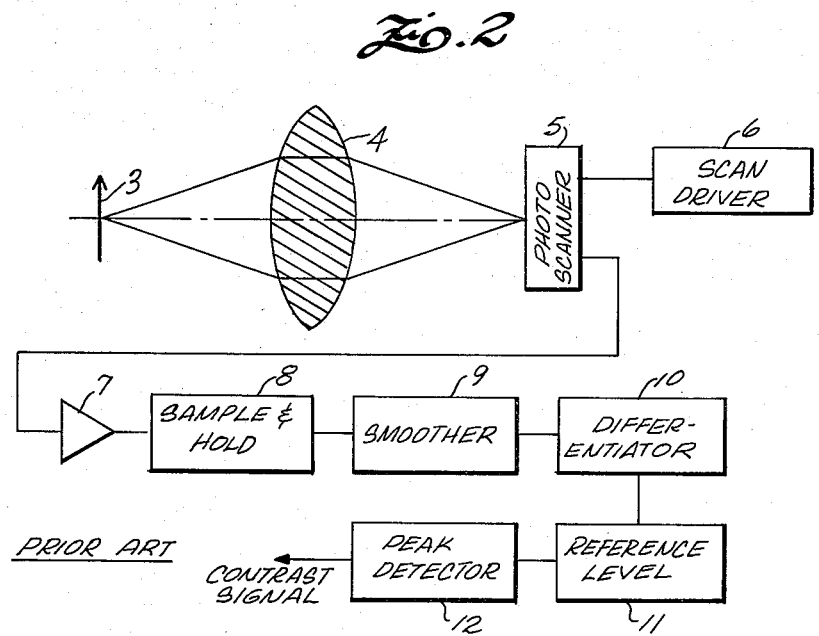
FIG. 2 is a circuit diagram in the well known focus detecting device utilizing the self-scanning photoelectric element.

There has already been proposed an automatic focus detecting device based on such principle of focus detection as has been described hereinabove, which may be implemented, for example, as illustrated by FIG. 2. The device illustrated uses a photoelectric element of a self-scanning type as the scanning means for the object image. An object to be photographed, designated by reference numeral 3, is projected by an objective lens 4 on a photoelectric element 5 of self-scanning type which is driven by a driver circuit 6 and generates a waveform defined by a timed series of pulses that vary in amplitude in accordance with the image brightness. This waveform is amplified by an amplifier 7 and then converted by a sample and hold circuit 8 to the corresponding analog signal. Undesirable high frequency components, if any, are removed under action of a smoother or low-pass filter 9 so that said signal may be converted to the waveform corresponding to the original brightness distribution of the object image. The output signal is then differentiated by a differentiator 10 and a signal representative of the slope of the brightness distribution is extracted. The signal is then converted by an absolute value or reference level circuit 11 to a positive or negative voltage of which a peak value within a single cycle of scanning is then detected by a peak value detector 12 and this peak value is held until the next peak value appears. The peak value output obtained in the manner as described hereinabove corresponds to a contrast signal serving, for example, to control a driving motor positioning the objective in a photographic camera of an automatic focusing type.

Figure 3:
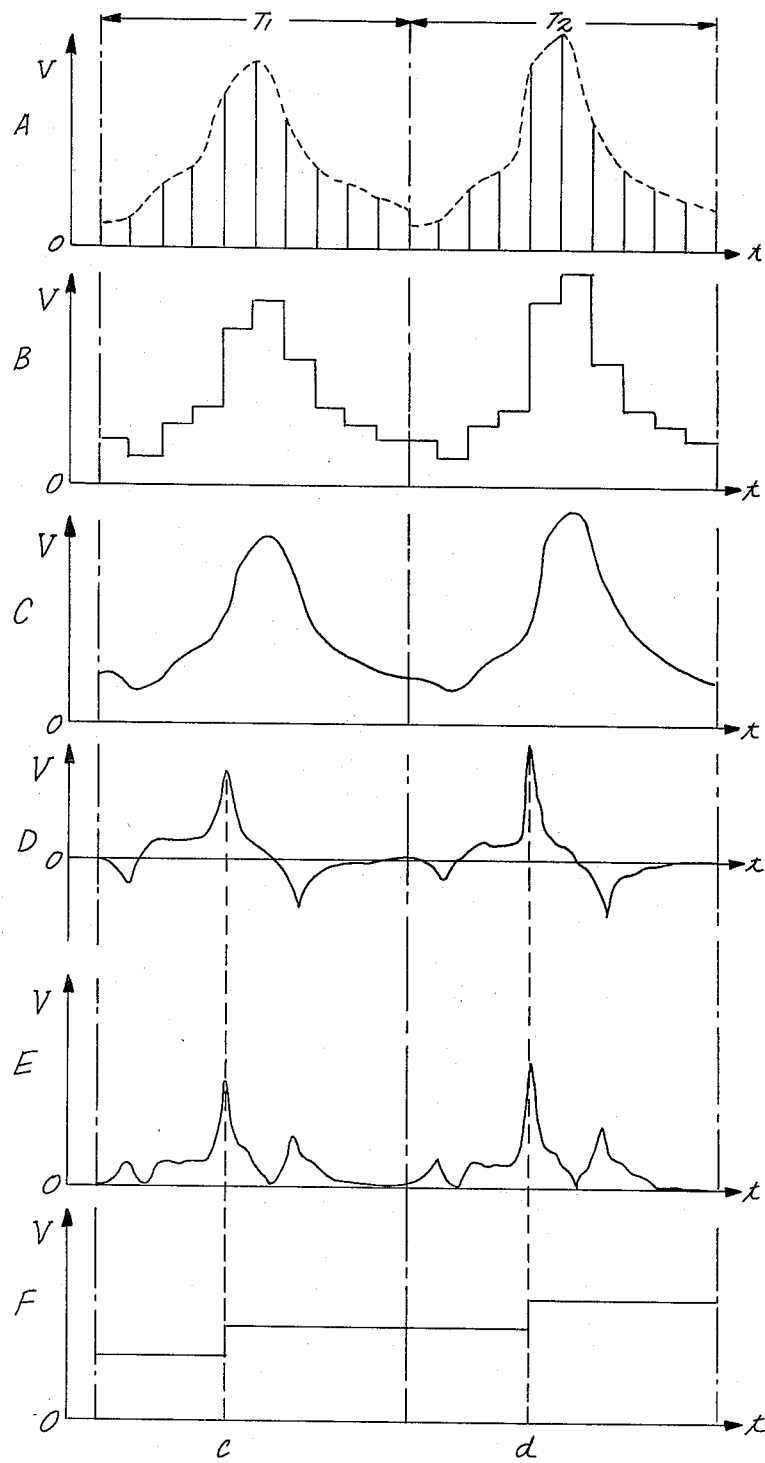
FIG. 3 diagrammatically shows the manner in which the waveform varies in the well known focus detecting device utilizing the self-scanning photoelectric element, in which FIG. 3A shown output waveform from the self-scanning photoelectric element.

FIG. 3 diagrammatically shows the manner of waveform variation in the previously described device, in which V represents voltage values and t represents a time duration. FIG. 3A shows an output waveform of the automatic scanning photoelectric element 5 and a brightness distribution of the object image is illustrated by a broken line. It should be noted that, in this diagram, the waveform is illustrated with respect only to two continuous cycles $T_1$ and $T_2$ of scanning, and the waveform within the cycle $T_2$ represents a more precisely focused state than the waveform within the cycle $T_1$. FIG. 3B shows an output from the sample and hold circuit 8, which exhibits, as shown, a stepped analog waveform. FIG. 3C shows a waveform obtained as a result of smoothing said analog waveform by a smoother 9. FIG. 3D shows a waveform obtained as a result of differentiation of said smoothed waveform by a differentiator 10. FIG. 3E shows an absolute value waveform obtained from processing said differentiated waveform by an absolute value circuit 11. A peak value of the absolute value waveform within the cycle $T_2$ is larger than a peak value of the absolute value waveform within the cycle $T_1$, since the waveform of the cycle $T_2$ represents a more precisely focused state than the waveform of the cycle $T_1$, as previously mentioned. Finally, FIG. 3F shows the manner in which the peak values are held by the peak value detector.

Figure 4:
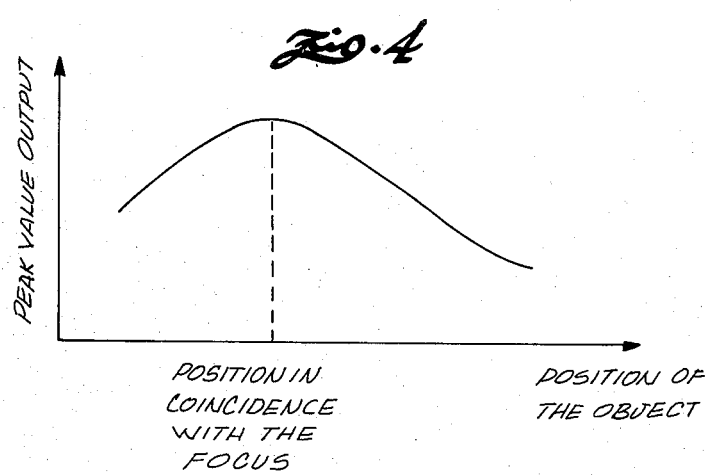
FIG. 4 diagrammatically illustrates a distribution of the peak value output serving as the contrast signal of the object to be photographed at focused and non-focused states.

Said peak value output varies relative to the position to which the objective has been positioned and takes the maximum value at the position in coincidence with the focus, as shown by FIG. 4. Although the device of prior art, as has been described hereinabove, can achieve automatic focus detection, there are some problems remaining unsolved. One of these problems lies in that the waveform smoothed by the smoother 9 cannot be precisely analogous to the brightness distribution of the original object image, as seen from FIG. 3C. More specifically, there occurs sometimes loss of high spatial frequency components due to a low frequency wave filter included in the smoother 9. However, attempts to prevent such loss can result in excessive high frequency components remaining in the stepped waveform output from the sample and hold circuit 8, which excessive high frequency components function as noise for the differentiated waveform. Another serious problem lies in that, when the peak value is detected by the peak value detector 12 from the absolute value waveform of the differentiated output, the differentiated waveform is too sharp to hold the accurate peak value. This makes it difficult to discriminate the position in coincidence with the focus, deteriorating the accuracy with which the focus can be detected. For these reasons, it has been difficult to manufacture and use said device of prior art in practice.

Figure 5:
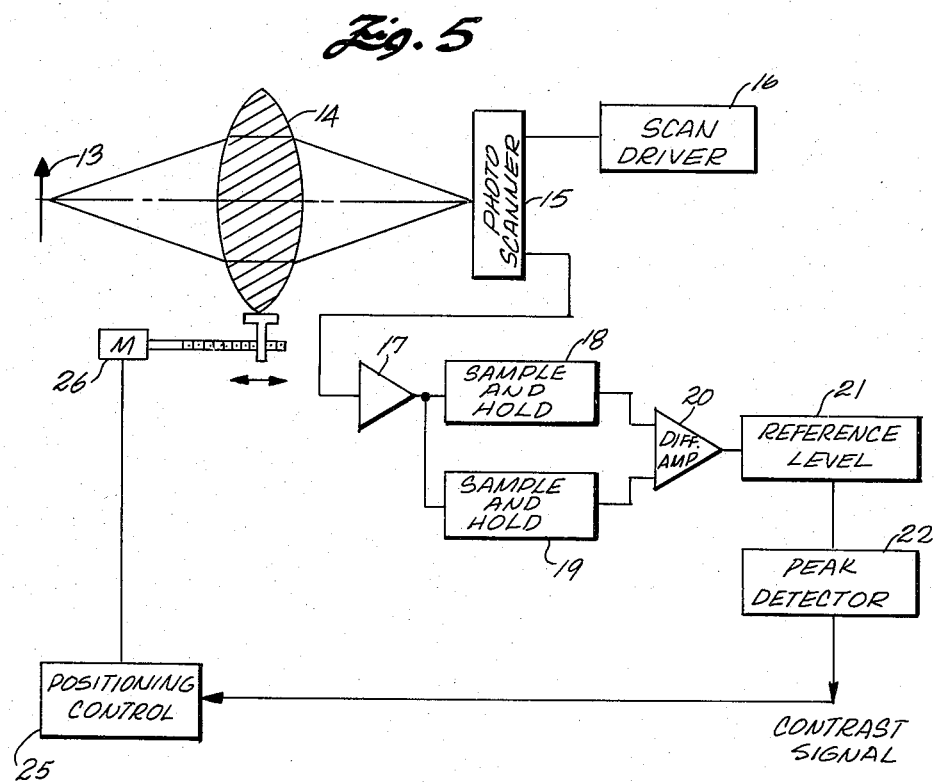
FIG. 5 is a circuit diagram illustrating an embodiment of the focus detecting device according to the present invention.
Figure 6:
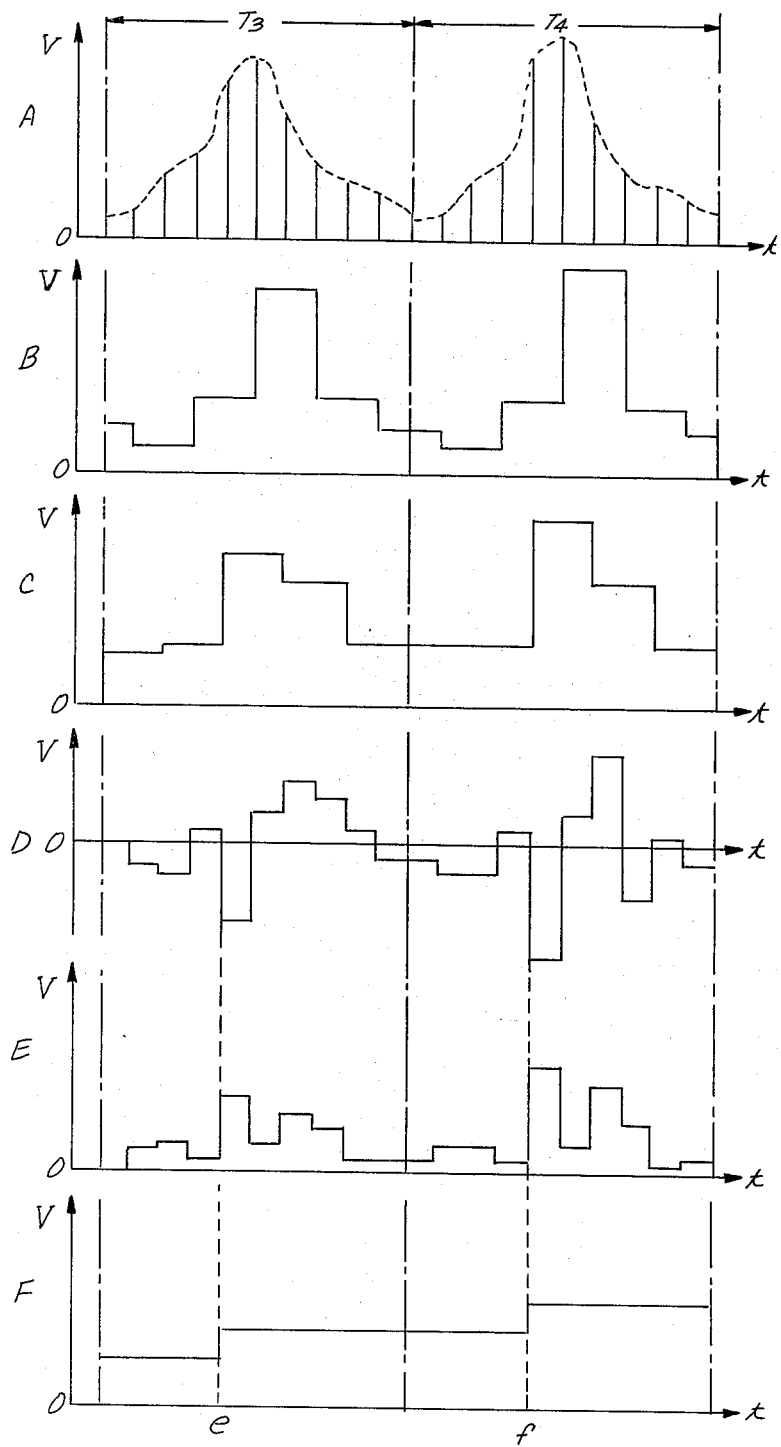

The present invention provides a focus detecting device making the most of advantageous properties of the self-scanning photoelectric element while overcoming the drawbacks as mentioned above to obtain a precise contrast signal. An embodiment of such device according to the present invention is shown by FIG. 5. FIG. 6 diagrammatically shows the manner in which the waveform varies with the device according to the present invention. An object 13 to be photographed is imaged by an objective 14 onto a self-scanning photoelectric element 15, which is driven by a driver circuit 16 and adapted to generate a signal having a series of pulses as illustrated by FIG. 6A. It should be noted that, in FIG. 6A, the waveform is illustrated with respect only to two successive cycles $T_3$ and $T_4$ of scanning, and the waveform within the cycle $T_4$ represents a more precisely focused state than the waveform within the cycle $T_3$. Broken line in FIG. 6A represents a brightness distribution of the object image.

The signal having a series of discrete pulses from the self-scanning photoelectric element 15 is amplified by an amplifier 17 and simultaneously applied to two sample and hold circuits 18, 19. The first sample and hold circuit 18 holds, as seen in FIG. 6B, output peak levels of pulses from alternate microphotoelectric elements. The second sample and hold circuit 19 similarly holds, as seen in FIG. 6C, the output peaks from the alternate microphotoelectric elements but shifted from the output waveform of the first sample and hold circuit 18 by one photoelectric element driving pulse, respectively. Each pair of output signals from the two sample and hold circuit 18, 19 are converted by a differential circuit 20 to a signal having a waveform corresponding to a difference of these two outputs. Such differential waveform is shown by FIG. 6D. This differential waveform is converted by an absolute value or reference level circuit 21 to a positive or negative absolute value waveform, as seen in FIG. 6E. A peak value of said absolute value waveform within a single cycle of scanning is held by a peak value detector 22 until the peak value within the next cycle of scanning appears. FIG. 6F shows the waveform of the peak value output thus held. Such peak value signal corresponds to an image contrast signal and takes the maximum value at a position in coincidence with the focus, as seen in FIG. 4. The contrast signal may be applied to a positioning control circuit 25 that operates a motor 26 to move the lens 14 to the proper focus.

A circuit arrangement in the device according to the present invention is illustrated by way of example in FIG. 7. A self-scanning photoelectric element 23 is driven by a scan driver circuit 24 including a pulse oscillator and provides an output signal having a series of pulses, the amplitude of each pulse corresponding to the level of light on the corresponding photoelectric element as it is scanned. The pulses are amplified by an operational amplifier $A_1$. In FIG. 7, $R_{1-16}$ designate resistors. The amplified signal is divided into two halves, each half consisting of alternate pulses which are respectively converted by two analog switches $S_2$, $S_3$ and two capacitors $C_1$, $C_2$ to two corresponding analog signals. The two analog signals are input through buffer amplifiers $A_2$, $A_3$ to an operational amplifier $A_4$ to extract a difference output derived from these two signals. Control pulses for the analog switches $S_2$ and $S_3$ are synchronized with the pulse oscillator in the driver circuit 24 and have a period twice that of the pulses serving to drive the self-scanning photoelement 23 and are shifted in period with respect to the latter by one pulse. The analog switch $S_1$ is arranged to reset the output for every driving pulse and thereby to hold the precise output of the photoelectric element. The difference output is converted by an operational amplifier $A_5$ and diodes $D_1$, $D_2$ to a positive absolute value waveform. This absolute value waveform is then amplified by an operational amplifier $A_6$, and a peak value of the absolute value waveform within a single cycle of scanning is held by an operational amplifier $A_7$, a diode $D_3$ and a capacitor $C_3$. An analog switch $S_5$ is provided to discharge the capacitor $C_3$ for every cycle of scanning. The peak value output thus obtained is processed by a buffer amplifier $A_8$ to produce a focus control signal $V_{out}$.

FIG. 8 is a timing chart of control pulses $P_1$, $P_2$, $P_3$, and $P_4$, respectively, for the analog switches $S_1$, $S_2$, $S_3$, and $S_4$ as well as of the driving pulses for self-scanning photoelectric element. T designates a single cycle of scanning.

With the device according to the present invention, as will be obvious from the foregoing description, there occurs no loss of high spatial frequency components necessary for detection of the image contrast since it is never required to smooth the sample and hold waveform of the photoelectrically converted output as in the usual method of contrast detection. Accordingly, more precise focus detection can be achieved. Furthermore, the absolute value waveform of the differential signal representative of the image contrast is not so sharp as the differentiated waveform and, therefore, it is easy to hold the peak value thereof and thereby to extract the precise peak value. Moreover, the circuit arrangement can be simplified, permitting the device to be compact. Finally, the present invention utilizes the accumulation effect of the self-scanning photoelectric element so that the contrast detection is possible even with respect to a dark object to be photographed. The present invention thus provides the compact focus detecting device with a high precision of detection.

What is claimed is:

1. A focusing control circuit for a camera, or the like, having an objective lens, comprising:
a self-scanning photoelectric unit including an array of photoelectrical elements lying substantially in the image plane of the lens and means scanning the output of each of the elements in timed sequence to provide a series of pulses in timed sequence whose amplitudes correspond to the level of light on the respective elements, means switching successive pulses of said series alternately to two outputs, means converting the series of pulses at the two outputs to two analog signals, differential means receiving the two continuous analog signals for generating a continuous analog difference signal whose amplitude varies in proportion to the difference in amplitude of the two analog signals, and peak detector means responsive to said continuous difference signal for generating a maximum output when the lens is focused on the image plane.

2. Apparatus of claim 1 further including means responsive to the output of the peak detector means for changing the position of the lens relative to the photoelectric unit to maximize the output of the peak detector means.

3. Apparatus of claim 1 wherein said means connecting the series of pulses at the two outputs includes a pair of sample and hold circuits.

4. A focus detecting device for photographic camera having an objective lens comprising a self-scanning photoelectric unit including a plurality of microphotoelectric elements located in a plane equivalent to the image plane of the objective lens and a scanner circuit; a driver circuit for the photoelectric element; two sample and hold circuits for converting the pulsed output waveform from the photoelectric element to the corresponding analog waveform; a differential circuit for detecting a difference of two outputs from the two sample and hold circuits; an absolute value circuit for clamping said differential output to an absolute value; a peak value detector for holding the peak value of the absolute value waveform within a single cycle of scanning of the photoelectric element, and switching means for connecting the odd numbered ones of the sample pulses of said microphotoelectric elements to the first sample and hold circuit and connecting the even numbered ones of the sample pulses of said microphotoelectric elements to the second sample and hold circuit, the differential circuit providing an output difference between each pair of adjacent microphotoelectric elements.

* * * * *